United States Patent
Morganstein

[11] Patent Number: 5,309,504
[45] Date of Patent: May 3, 1994

[54] AUTOMATED IDENTIFICATION OF ATTENDANT POSITIONS IN A TELECOMMUNICATION SYSTEM

[75] Inventor: Sanford J. Morganstein, West Dundee, Ill.

[73] Assignee: Syntellect Acquisition Corp., Phoenix, Ariz.

[21] Appl. No.: 793,843

[22] Filed: Nov. 18, 1991

[51] Int. Cl.$^5$ .................. H04M 3/22; H04M 3/50; H04Q 3/64
[52] U.S. Cl. .................. 379/67; 379/88; 379/142; 379/214; 379/218; 379/247; 379/265
[58] Field of Search .......... 379/218, 214, 213, 266, 379/265, 223, 88, 67, 142, 89, 245, 246, 247, 84

[56] References Cited

U.S. PATENT DOCUMENTS

| | | | |
|---|---|---|---|
| 3,989,899 | 11/1976 | Norwich | 379/134 |
| 4,599,493 | 7/1986 | Cave | 379/247 |
| 4,694,483 | 9/1987 | Cheung | 379/34 |
| 4,797,910 | 1/1989 | Daudelin | 379/67 |
| 4,797,911 | 1/1989 | Szlam et al. | 379/67 |
| 4,797,913 | 1/1989 | Kaplan et al. | 379/91 |
| 4,896,345 | 1/1990 | Thorne | 379/67 |
| 4,908,850 | 3/1990 | Masson et al. | 379/88 |
| 4,939,771 | 7/1990 | Brown et al. | 379/67 |
| 5,001,710 | 3/1991 | Gawrys et al. | 379/265 X |
| 5,003,574 | 3/1991 | Denq et al. | 379/75 |
| 5,012,512 | 4/1991 | Basso et al. | 379/218 |
| 5,040,208 | 8/1991 | Jolissaint | 379/209 |
| 5,163,081 | 11/1992 | Wycherley et al. | 379/52 |
| 5,164,981 | 11/1992 | Mitchell et al. | 379/88 |
| 5,181,239 | 1/1993 | Jolissaint | 379/96 |

*Primary Examiner*—Thomas W. Brown
*Attorney, Agent, or Firm*—Richards, Medlock & Andrews

[57] ABSTRACT

In a communication complex having attendant positions and data terminals, the audio equipment of each position can be associated with the data terminals without direct connections between the switching system which drives the audio equipment and the host computer which drives the terminals. A programmed controlled call processor communicates between the switching system and the host computer and maintains a correlation between the audio equipment and the data terminals. In response to incoming calls, the call processor solicits from an attendant identification information and then accesses a look-up table with such information to find a data terminal associated therewith. Data terminal identification information is coupled to the host computer so that data can be transmitted and displayed on the terminal associated with the attendant responding to the incoming call.

31 Claims, 5 Drawing Sheets

| | 114 | |
|---|---|---|
| 112 – AGENT 1 ID | TERMINAL 1 ID | AGENT 1 EX. NO. – 116 |
| AGENT 2 ID | TERMINAL 2 ID | AGENT 2 EX. NO. |
| ⋮ | ⋮ | ⋮ |
| AGENT N ID | TERMINAL N ID | AGENT N EX. NO. |

AUTOMATED IDENTIFICATION OF ATTENDANT POSITIONS IN A TELECOMMUNICATION SYSTEM

TECHNICAL FIELD OF THE INVENTION

The present invention relates in general to telecommunication systems, and more particularly to systems having attendant positions equipped with data terminals.

BACKGROUND OF THE INVENTION

The automation of many telecommunication services has facilitated the completion of calls without requiring the assistance of live operators, agents, attendants or the like. U.S. Pat. Nos. 4,696,028 and 4,783,796 illustrate techniques for automating private branch exchange (PBX) and other types of switching systems with call processors so that the calling parties can direct and supervise the completion of their calls, all without the assistance of live operators. Voice prompts are generated by the call processors and transmitted to the calling parties to input the extension number. Upon receipt of DTMF digit information input by the calling party, the call processor provides a communication path through the switching system to the telephone set assigned the extension number. Calls can thereby be completed without the assistance of operators.

Other communication services often require the exchange of information, often necessitating the retrieval of data stored in a computer data base. For example, many wholesale, retail, distributor and service organizations require the exchange of information involving the calling party and the data base files of a data processing system. An order entry system providing such services is illustrated in U.S. Pat. No. 4,908,850. In such a system, an interactive voice response computer allows an exchange of information between a data base and the calling party wishing to place an order. In the event operator assistance is required, a computer connects the calling party to an attendant position equipped with a data terminal, whereupon an operator can communicate information between the calling party and the data base. Once the calling party is connected to the data base, the interactive voice response system is disconnected. In such a system, a computer actively controls the interactive voice response computer by a data line, thereby slaving the systems together. Moreover, the various systems are especially designed for a unique connection together so that high level functions can be carried out.

Another customer account system providing operator/data terminal interfaces between customers and a data base is illustrated in U.S. Pat. No. 4,797,911. In this system, a complicated arrangement of a system controller, data controller, PBX switch, mainframe computer and other interfaces is utilized to provide an interaction between the calling parties, the live operators, associated data terminals, and a mainframe computer data base. Here, the system controller is connected to a PBX switch by a serial control line, thereby slaving all the equipment together.

Other computer systems and telephone switching systems, for example those using capabilities known by the trademark CALLPATH TM, have integrated such systems together with a data link to allow the telephone system to identify attendants who have answered incoming calls so that the computers can transmit data to the agent's terminal screen. Although data and oral communications can be carried on with such type of system, there is required complex software in order to allow communications between such systems. In addition, such computer to telephone system data links are proprietary and often require different protocols which are specifically adapted to operate with specific computers and telephone systems.

In yet other telecommunication systems, incoming calls are also transferred to an idle operator. By communicating with the calling party, the attendant is apprised of the identity of the calling party, such as name, address, account number, etc. The attendant then inputs the calling party identification number into the keyboard of the data terminal, whereupon the data base computer retrieves the data files of the calling party and displays such information on the data terminal screen. Although such manual entry of the identification information by the attendant may be lengthy and time consuming, such system is effective in providing the attendant with the appropriate data files.

In situations in which many calls are processed, a good deal of time and money could be saved if the identification process and the entry of such identification information to the computer system could be automated. If the portion of each call involved in the identification and concomitant data entry portion of such calls could be substantially reduced, then the organization taking such calls could decrease the time a calling party must wait for service. By reducing the time required of an attendant to initially provide information and services to calling customers, the organization could provide the same level of service to callers with correspondingly fewer attendants.

Other similar applications often arise in which the switching system and the data base computer are physically separate and the interconnection therebetween of a specialized digital control line is inappropriate or electrically disadvantageous. The integration of switching systems and data base computers would be facilitated if standardized systems of both types could intercommunicate without specialized lines.

From the foregoing it can be seen that a need exists for a telecommunication complex in which the switching system and the host computer operate autonomously, and no specialized, slaving or control lines are required directly therebetween. A further need exists for a telecommunication system in which information is passed between the switching system and the host computer by way of a call processor which provides information correlating live attendants to data terminal equipment so that the switching system can provide aural communications to the attendant and the host computer can provide data information to the terminal presently being used by the attendant. In this manner, the attendant is not required to input lengthy calling party identification data into the terminal keyboard.

SUMMARY OF THE INVENTION

In accordance with the invention, telecommunication and computer equipment is disclosed, and a method of operation thereof, which equipment and technique substantially reduce or eliminate the disadvantages and shortcomings of the prior art systems. According to an important feature of the invention, an interactive call processor receives incoming calls and directs the same to a switching system, and also communicates with a data base host computer adapted for communicating with plural data terminals.

Incoming telephone calls are received by the call processor and voice prompts are returned so that the calling party can enter his or her identification information. When received by the call processor, such information is temporarily stored for later transferral to the data base computer. The call processor then requests service of the switching system which selects an idle attendant position. The call processor transmits to the attendant a voice prompt to input attendant position identification information, which information is also received and stored by the call processor. The call processor consults a look-up table which correlates the various attendant positions with the data terminals. The calling party identification information and the correlated data terminal identity is transmitted to the host computer so that the appropriate data can be displayed on the terminal associated with the selected attendant position. The calling party is then cut through by the call processor through the switched connection of the switching system to audio equipment associated with the selected attendant position. The attendant can then communicate with the calling party using the displayed data.

In accordance with another feature of the invention, the correlation look-up table can be programmed by the attendants should they change positions during a work schedule with regard to the various data terminals.

According to an important feature of the invention, the call processor can receive and decode attendant identification information by speech recognition equipment, or by the operator input of a few touch tone digits. The input of attendant identification information by these techniques is fast and efficient, and requires little or no additional time on the part of the attendant. Calls are thereby serviced more quickly.

According to a related feature of the invention, the call processor includes voice recognition equipment for identifying the spoken words of the attendants themselves, and by the use of the look-up table the respective positions and data terminals with which they are associated. As a result, identification of the attendant positions selected by the switching system can be achieved during oral communications between the calling party and the attendant, thereby realizing an efficiency in serving the calling party and completing the call. The call processor can also be equipped with automatic number identification (ANI) equipment for identifying the calling party and providing such information to the data base computer for retrieving an associated record so that it can be later displayed, if necessary, on a terminal screen associated with the selected attendant position.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
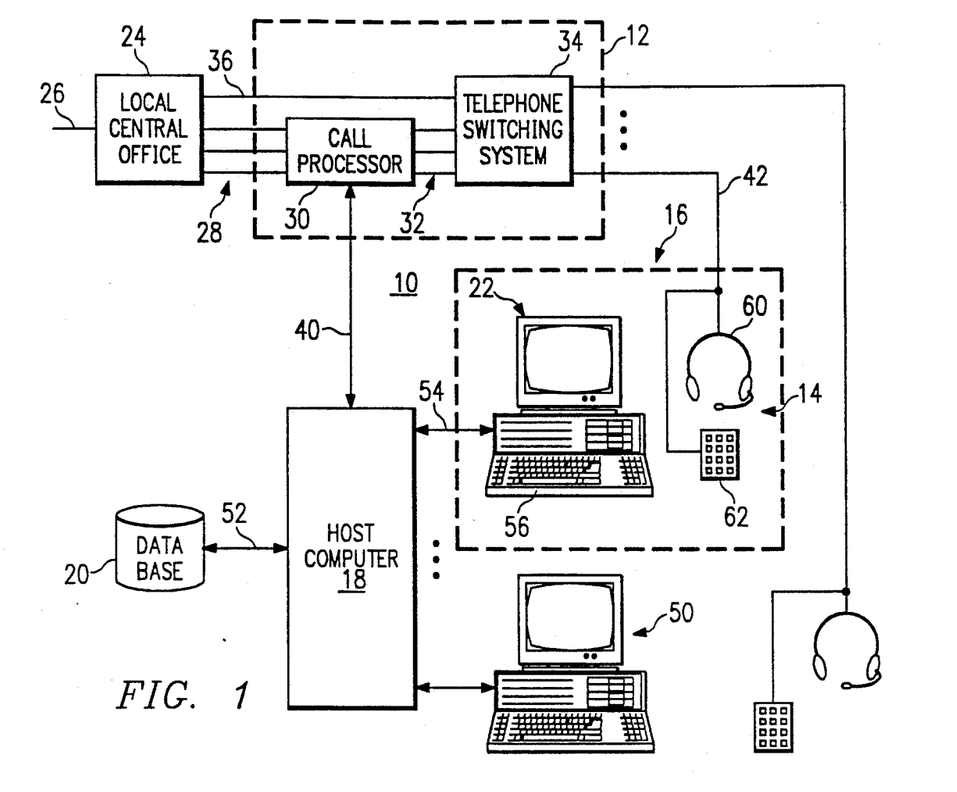
FIG. 1 is a block diagram illustrating the basic structure of the invention.

With reference now to FIG. 1 of the drawings, there is illustrated an exemplary system in which the invention may be advantageously practiced. Shown is a telecommunication complex 10 including a call distribution system 12 for controlling audio equipment 14 associated with an attendant position 16. A host computer 18 is adapted for driving a number of attendant position data terminals, such as 22, for the display of data retrieved from a data base 20.

The telecommunication complex 10, and particularly the call distribution system 12, is connected to the public telephone system, denoted as a local central office 24. Local or long distance telephone calls received by the central office 24 on incoming trunks or carrier equipment 26 are switched to outgoing trunks or lines 28 to the call distribution system 12.

More specifically, the call distribution system 12 includes a call processor 30 connected by trunks or subscriber lines 32 to a switching system 34. The switching system 34 can be of the PBX or PABX type, key telephone system, Centrex switching system or other commonly used type of switching system. The call processor 30 is connected to the local central office 24 by the lines 28. The switching system 34 can be connected to the local central office 24 by other trunks or lines 36 to provide communication facilities for outgoing telephone calls. While the switching system 34 is shown connected to attendant position equipment 16, such system can also provide services to telephone sets and other communication equipment connected to the switching system 34 by subscriber or other types of communication lines.

The call processor 30 can be of the type which may be retrofitted to, or integrated within the switching system 34. Call processors of well-known construction are described in detail in U.S. Pat. Nos. 4,696,028 and 4,783,796, the disclosures of which are incorporated herein by reference. Such call processors provide efficient operation by the transmission of voice prompts to calling parties and the receipt of corresponding information for completing calls in an expedited manner. Typically, call processors have been used in conjunction with on-premises PBX switching systems to prompt calling parties for the input of telephone extension digits, for receiving such digits and connecting the calling parties directly to the telephone sets of the switching system, all without the intervention of an operator or attendant.

The basic operation of the telecommunication complex 10 is carried out as follows. In response to an incoming call on a line 28, the call processor 30 returns to the calling party a voice prompt to input a telephone number, account number, an insurance policy number, a credit card number or other information identifying the calling party or the nature of the call. Typically, the calling party will enter such information by way of the DTMF or touch tone keypad on his or her telephone. The calling party identification information is decoded by circuits in the call processor 30, and stored for later transferral to the host computer 18 by way of a conventional data link 40. The data link 40 may be either of a serial or parallel nature for allowing instructions and data information to be passed from the call processor 30 to the host computer 18.

Concurrently with the foregoing, the call processor 30 communicates to the switching system 34 by way of an interconnecting subscriber line 32 a request for service. Thus far in the communication process, sufficient information is not available to allow the host computer 18 to transfer such data records to the appropriate data terminal 22, as it is not known which terminal is or will be associated with a selected one of the idle attendant positions 16. In response to a request for service of the switching system 34 for an attendant to assist the calling party, such system selects an idle attendant position 16. The switching system 34 provides a switched voice connection between the appropriate incoming subscriber line 32, or trunk, and a subscriber line 42 associated with the audio equipment 14 of the selected idle attendant position 16.

At this time, the calling party is terminated at the call processor 30 and is not yet able to verbally communicate with the selected attendant. The call processor 30 being connected through the switching system 34 to the audio equipment 14 of the selected attendant then transmits a voice prompt to solicit the input of attendant identifying information. When input by the attendant, the call processor 30 receives such information by circuits in the call processor and accesses a look-up table to correlate the attendant identification information to a specific one of the data terminals associated with the selected attendant position. The correlated information related to the identified data terminal 22 is transmitted to the host computer 18 via the data link 40, along with the calling party identification information.

The call processor 30 then cuts through the calling party to the subscriber line 32, and thus through the switching system 34 to the selected attendant position 16. The calling party and the attendant can then verbally communicate with each other. Concurrently, the host computer 18 cross-references such calling party identifying information with appropriate data records in the data base 20 associated with the calling party. The host computer 18 then transmits the data records previously associated with the calling party to the data terminal 22 of the selected attendant position. The attendant thereby has displayed on the data terminal screen appropriate information concerning the calling party's business or transaction.

From the foregoing, it can be appreciated that the switching system 34 operates autonomously with respect to the host computer 18, in that neither directly controls each other. Rather, the switching system 34 operates in its traditional manner with the conventional inputs and outputs, as does the host computer 18. A significant technical advantage of the invention is that the telecommunication complex 10 can be structured to include standard and nonspecialized equipment which requires neither highly sophisticated software or programming, or highly specialized control lines. Another technical advantage of the invention is that the look-up table of the call processor 30 can be programmed by the attendants so that there is always a current association between each attendant and a data terminal. In this manner, should the attendants move from one attendant position to another, the look-up table can be reprogrammed, and the identity of the attendants is always available to the call processor 30 for correlation to a data terminal 22.

The host computer 18 can be of any conventional mainframe or other type of processor or computer having a plurality of output ports for driving a corresponding plurality of data terminals as shown as 22 and 50. The host computer 18 is provided with a parallel bus 52 for accessing the data base 20; using address and control signals when reading the data base 20, and address, control signals and data when writing the data base 20. The data base 20 is preferably a disk drive type of mass memory with relatively high speed access cycles. The bidirectional data link 54 to each terminal 22 can be of any type, such as twisted pair, coaxial, etc., for carrying high speed serial data according to a predefined format for display on the terminal screen. In addition, each data terminal 22 includes a keyboard 56 for entry of data and corresponding transfer thereof to the host computer 18, via the data link 54. The data terminals 22 can be of any conventional type, such as an IBM pc, or an IBM 3270 type of terminal, or a serial ASCII terminal.

As noted above, the audio equipment 14 is connected to the switching system 34 by way of conventional subscriber lines 42. Each subscriber line 42 terminates in a headset 60 which includes one or two earpieces to allow the attendant to receive audio and speech sounds, and a mouthpiece or microphone for transmitting speech signals. The subscriber line 42 also connects to a telephone keypad 62 which can be physically part of the data terminal 22. The telephone keypad 62 is preferably of a type for transmitting dual tone multifrequency (DTMF) signals representative of digit information. Each attendant position is similarly equipped with the noted equipment.

Figure 2:
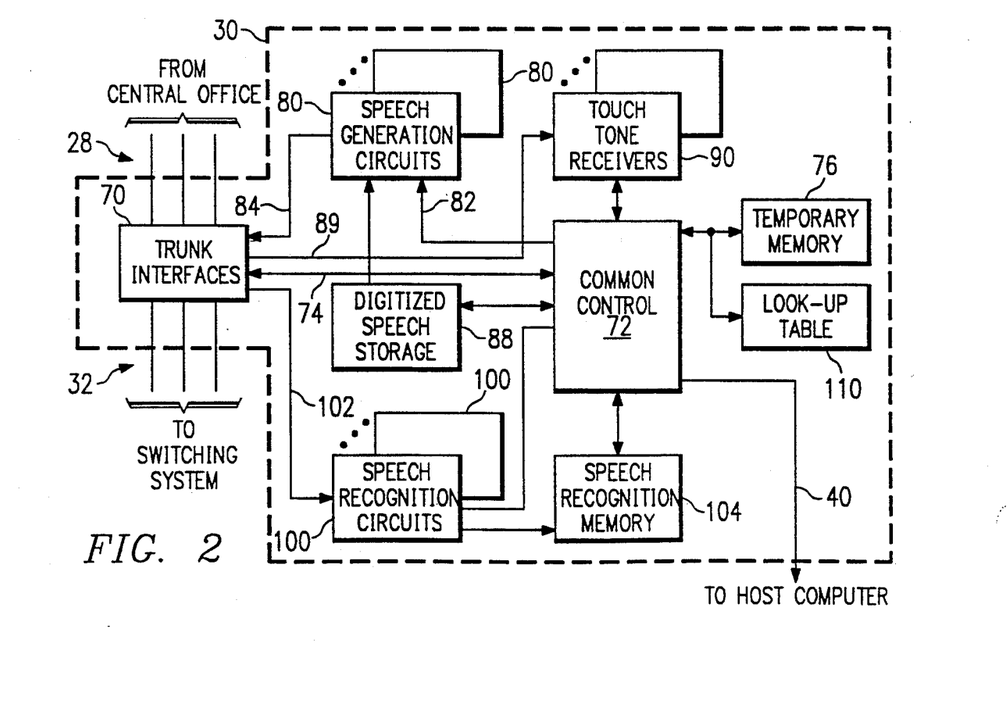
FIG. 2 is a more detailed block diagram of the call processor.

FIG. 2 illustrates in block diagram form those circuits which are provided in addition to the call processor circuits disclosed in U.S. Pat. No. 4,696,028, for achieving the overall functions described herein. The call processor 30 includes a number of trunk interfaces 70 for sensing incoming requests for service on the incoming trunks 28 and providing corresponding signalling, such as ringing, on the outgoing subscriber lines 32 directed to the switching system 34. The circuits of the trunk interfaces 70 are connected to a processor, or common control 72, by a number of control and sensing lines 74. The common control 72 includes an associated temporary semiconductor memory 76. A number of speech generation circuit modules 80 are provided for converting to analog form the various voice prompts utilized according to the invention. The selection of the various voice prompts from a digitized speech storage unit 88 is controlled by the common control 72. Control signals are transmitted by the common control 72 to the speech generation circuits 80 by way of control lines 82 to cause conversion of certain ones of the voice prompts. The voice prompts are essentially converted into analog form by the circuit modules 80 and coupled to the respective trunk circuits 70. While not shown, the speech generation circuits may be connected to a matrix switch for switching to selected ones of the trunk interfaces 70.

Various voice prompts of particular importance include one transmitted to incoming callers, which may be the verbiage "Thank you for calling XYZ Insurance Co., for expedited service, please enter your insurance policy number on your touch tone phone." The digitized speech storage medium 88 is comprised of disc storage media for storing in digital form the various voice prompts. The digitized words stored in the memory 88 can be accessed by the common control 72 and transferred to the speech conversion circuits 80 for conversion into analog form. While not shown, the call processor 30 includes buses which may connect the various circuits together to achieve the transmission of analog information. For example, the touch tone receivers 90 are preferably connected directly to the trunk interfaces 70 with conductors 89 for carrying the DTMF signals to the receivers 90. In addition, while the digitized speech storage unit 88 is controlled by the common control 72, other data paths may be provided between the digitized speech storage unit 88 and the speech conversion circuits 80 for the transferral of digitized speech data.

In response to the voice prompt, the calling party can enter his or her insurance policy number by way of a DTMF keypad, the tones of which comprise caller identification information. The touch tone signals are coupled by the call processor 30 to a selected idle touch tone receiver 90 and are decoded into digital form readily processed by the common control 72. Such caller identification information is transferred by the call processor 30 on data link 40 to the host computer 18 in the manner described above. It is to be noted that the data link 40 may also be of the type of link 54 connecting the host computer 18 to a data terminal 56. When the data link 40 is of the same type as the data link 54, the call processor 30 communicates to the host computer 18 by emulating a data terminal.

The call processor 30 also includes a number of speech recognition circuits 100 connected to the trunk interfaces by conductors 102. Speech information coupled to the trunk interfaces 70 by way of either the incoming trunks 28 or the communication lines 32 can be switchably coupled to the speech recognition circuits 100 for processing. Speech recognition circuits are well-known in the art and commercially available for converting spoken words into corresponding digital signals. For example, the spoken word "ten" can be recognized by the speech recognition circuits 100 and converted into a digital format representative of the numerical value "10". In like manner, the spoken word "the" can be recognized by the circuits 100 and converted into ASCII characters representative of the three alphabet letters. Also, commercially available speech recognition circuits can select the identity of a given speaker from a predefined list of potential speakers and may therefore provide the identity of the instant speaker in digital form such as the ASCII characters, "SPKR#5". Associated with the speech recognition circuits 100 is a speech recognition memory 104. As will be described in more detail below, the memory 104 is utilized in conjunction with the recognition circuits 100 to decipher speech signals into digital form.

In accordance with an important feature of the invention, a look-up table 110 is accessible by the common control processor 72. The table 110 is utilized for referencing attendant identification information with corresponding data terminals 22. The programmable structure of the look-up table 110 is shown in more detail in FIG. 3. In practice, the look-up table 110 may comprise a portion of the temporary memory 76 or other nonvolatile type of storage area.

Figure 3:
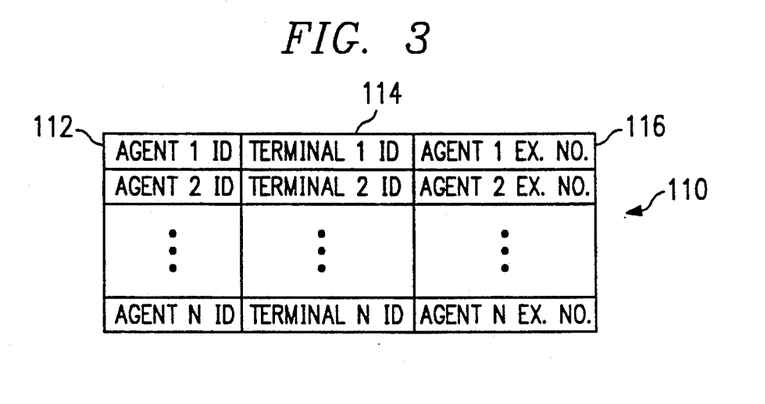
FIG. 3 illustrates the look-up table employed by the call processor for referencing attendants to data terminals.

The format of the look-up table 110 is shown in FIG. 3 in simplified form to facilitate understanding of the nature of the data stored therein and the correlation therebetween. In practice, the programming of such identification data in actual memory locations would be significantly different than the format shown.

Programmed by the call processor 30 into the first entry 112 of the table 110 is attendant identification information. When an attendant begins a work period, he or she can program the memory location 112 by utilizing the telephone keypad 62 to place a call to the call processor 30. The attendant can simply cause the subscriber line 42 to go off-hook by a switch or other means not shown, dial a predefined extension number associated with the call processor 30, whereupon the switching system 34 connects the associated subscriber line 42 to the call processor 30. When the call processor 30 answers the call, the attendant can dial a predefined code in touch tone format, which code is received and converted into a digital code by a selected one of the touch tone receivers 90. The call processor 30 is preprogrammed to recognize such a code as initiating a procedure intended to associate a specific attendant with a specific data terminal 22.

After the attendant dials the preprogrammed code, the attendant will either speak a predetermined utterance if speaker dependent speech recognition equipment is used by the call processor 30, or will dial the attendant's identification number via the touch tone keypad 62. Once the attendant identification information is received by the call processor 30, the common control 72 will cause the digitized speech storage equipment 88 to transmit a selected phrase to the speech generation circuit 80. The speech generation circuit 80 transforms the digitized speech signals into analog form so that the attendant hears a voice prompt instructing him or her to enter the identity of the associated data terminal 22, via the touch tone keypad 62. Again, the touch tone receiver 90 decodes the data terminal identification number, whereupon the common control 72 causes such number to be stored in memory location 114, in association with the agent identification number stored in location 112. The horizontal nature of the storage locations 112 and 114 signify an association therebetween.

Alternatively, the terminal identification numbers can be permanently stored in sequential order in memory locations 114, and the attendant identification numbers later written into the appropriate memory locations 112 in association with the terminal ID numbers. However, those skilled in the programming art can readily recognize that data can be stored in many different forms and associated by pointers, indices, addresses, etc. As each attendant signs on the telecommunication complex 10 at the beginning of a work period, or when an attendant changes positions, similar identification number entries are then programmed into the various memory locations so that specific attendants and data terminals 22 can be later associated. Essentially, the association between attendant identification numbers and the terminal identification numbers allows the host computer 18 to provide a match between a selected attendant at a position so that data can be sent to the terminal, also associated with that position.

Memory locations 116 can be programmed with the extension numbers, or other related data, of the subscriber lines 42 associated with each attendant position 16. The memory locations 116 provide another level of association or correlation for allowing the call processor 30 to associate an attendant with a data terminal 22. For example, since a subscriber line 42 is uniquely associated with each data terminal 22 of a position 16, by knowing the subscriber line extension number which the attendant is using with a particular position 16, the look-up table 110 can be utilized to find the associated data terminal 22.

Figure 4A:
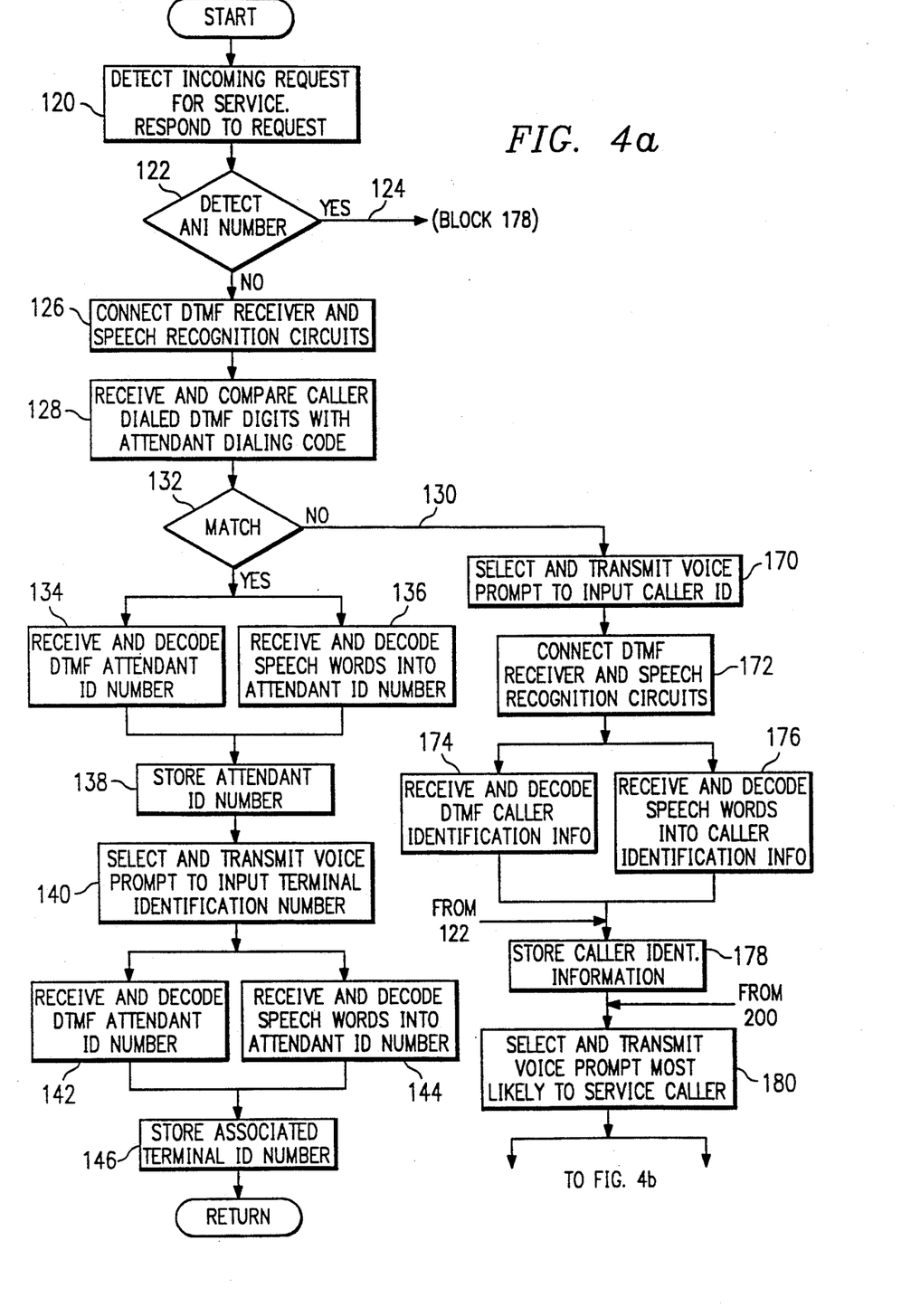
FIGS. 4a-4c comprise a flow chart of the programmed operations carried out by the telecommunication complex in providing communications of voice and data information to a calling party.
Figure 4B:
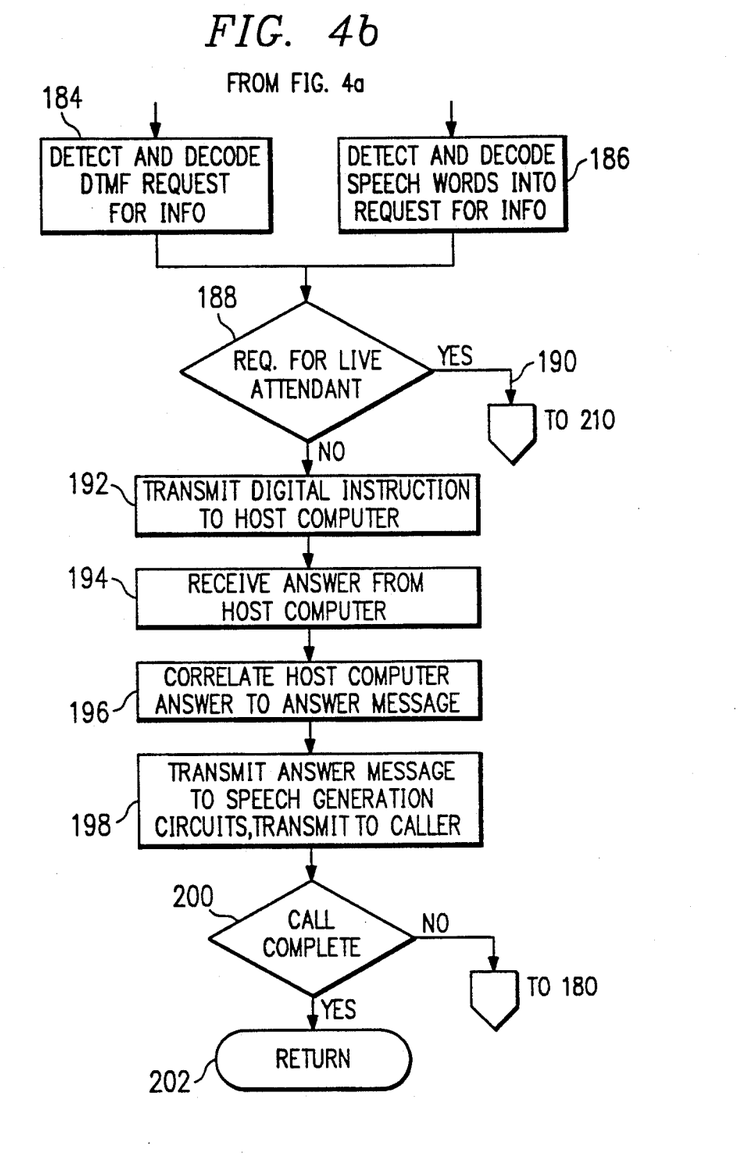
Figure 4C:
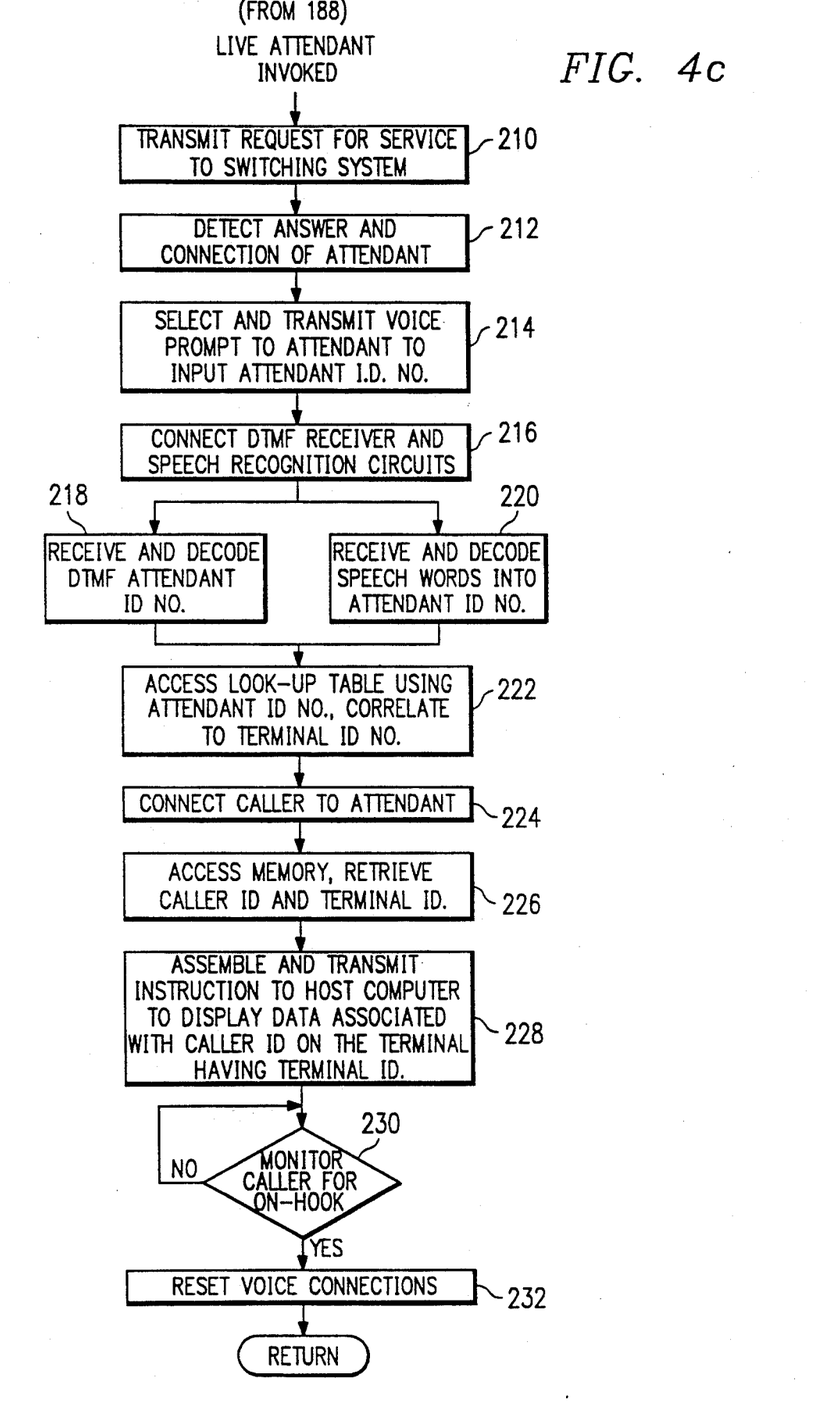

FIGS. 4a–4c, when connected together, comprise a flow chart illustrating the functions carried out by the telecommunication complex 10 in coordinating communications between a calling party and an attendant position equipped with audio apparatus 14, and a data terminal 22. The flow chart depicts the operational functions carried out primarily by the call processor 30, it being realized that the switching system 34 and the host computer 18 are conventionally programmed to carry out their respective, traditional functions. As a result, and in accordance with an important feature of the invention, modification of either software or hardware of the switching system 34 or the host computer 18 is generally not required, and thus conventional switching and computer equipment can be utilized.

With reference to FIG. 4a, the programmed operations of the call processor 30 start by the detection of an incoming call, such as by detecting ringing, shown by program flow block 120. Once a request for service is detected on an incoming call processor trunk 28, such request is processed by circuitry in the trunk circuits 70, as is conventional. Depending on the automatic number identification (ANI) protocol utilized, the call processor 30 may provide connections in the trunk interfaces 70 for detecting automatic number ANI data transmitted from the remote central office 24 or switching system. ANI type of communication facilities and lines are available, whereby the telephone number of the calling party is transmitted after receiving a wink signal from the call processor 30. The call processor 30 may be programmed to accept other protocols between the first and second ringing signal and before ringing is tripped. The call processor 30 can be programmed to provide the detection of ANI numbers, depending upon whether or not such type of trunks and facilities are available, and comprise one of the incoming trunks 28. If the ANI number is detected and decoded, program control branches along line 124 to block 178, to be described in more detail below.

Otherwise, program control branches to block 126 where a touch tone receiver 90 is connected to the appropriate trunk circuit 70 for receiving digits dialed by the calling party. As noted in block 128, the common control 72 of the call processor 30 compares the caller-dialed digits with the preprogrammed agent dialing code to determine if a special incoming call is placed by an attendant situated at one of the attendant positions 16. According to a feature of the invention, and as noted above, when an attendant starts a work period at a particular position 16, or resumes work at a different position 16, the attendant can utilize the touch tone keypad 62 and other hand-operated switches of the position 16 to initiate a telephone call through the switching system 34 to the call processor 30. Essentially, the attendant can cause the associated subscriber line 42 to go off hook and receive a dial tone, and thereafter dial a special telephone number. The call processor 30 may be assigned a special directory number, whereupon the switching system 34 outpulses the telephone directory number on outgoing trunk 36 to the local central office 24. The local central office 24 recognizes that the special directory number is one assigned to the call processor 30, whereupon the attendant outgoing call is transferred to the call processor 30.

Alternatively, the switching system 34 may transfer the attendant initiated call directly to the call processor 30 on a line 32. In any event, the call processor 30 is programmed to recognize the special code input by the attendant by comparing the dialed digits with the preprogrammed code to find a match. If a match is found, such as shown in program flow block 130, the common control 72 proceeds to program blocks 134 and 136. If no match is found between the dialed digits and the special programmed code, such call is considered a conventional incoming call, and is processed by taking the program route indicated by line 130. A typical incoming call will be described below with respect to the program flow blocks connected to line 130. with which the call processor 30 is programmed to recognize. In processing the attendant-initiated telephone call, the common control 72 of the call processor 30 is structured and programmed to receive and detect agent identification information input by the attendant either by DTMF signals or by speech words. Program flow block 134 signifies the use of the touch tone receivers 90 for receiving and decoding the DTMF agent identification number, while block 136 signifies the receipt and decoding of speech words defining the agent identification number. The attendant identification number can be a one, two or three digit number, depending upon the number of agents employed to operate the positions 16. The input of such a few digits can be carried out very quickly. It should be understood that after the attendant dials the special code and the call processor 30 returns an acknowledgement, the identification number assigned to the attendant is subsequently input either by the DTMF keypad or by spoken words. When the attendant identification number is decoded, it is temporarily stored in memory, such as shown by program flow block 138. It is to be noted that the attendant identification can be made by decoding a phrase spoken by the attendant, such as "one, two, three" or by having the attendant speak a predefined phrase such as "Sally", whereby the attendant's voice pattern is matched against prestored digitized representations of the attendant in order to find a match according to well-known speaker identification methods. Thereafter, the common control 72 accesses the digitized speech storage unit 88 and causes a voice prompt to be delivered to the speech generation circuits 80. The voice prompt is a verbal message transmitted to the attendant, instructing the attendant to input the identification number of the data terminal 22 located at the attendant's position. Again, touch tone receivers 90 and speech recognition circuits 100 are connected to the appropriate trunk interface 70 to receive the response of the attendant. The identification number of the terminal could simply be a one, two or three digit number, depending upon the number of attendant positions serviced by the switching system 34.

Once the attendant identification number has been decoded by either the touch tone receiver 90 or the speech recognition circuits 100 (blocks 142 and 144), program flow branches to block 146 where the data terminal identification number is stored in the table 110. Significantly, since the equipment of each attendant position, i.e., the data terminal 22, the headset 60 and the subscriber line 42 are generally always associated with each other, and not intermingled with other position equipment, once the terminal identification number is known or decoded by the call processor 30, the telephone extension number associated with the subscriber line 42 is also known. Accordingly, in programming the look-up table 110, the terminal identification number 114 can be associated with the agent extension number in memory location 116 during initial programming of the table 110. Therefore, when the common control 72 stores the agent identification number in the look-up table 110 in response to the foregoing programmed operations, all that is necessary is for the common control 72 to determine the terminal identification number, and in the associated agent identification memory location 112, write the identification number entered by the attendant.

Referring again to FIG. 4a, it is noted that conventional incoming calls are processed along program flow chart line 130 to block 170. Here, an incoming call which was received by the call processor 30 on one of the incoming trunks 28 is further processed by selecting and transmitting a voice prompt to the calling party, to input caller identification information. Such a prompt may be in the nature of, "Please enter you policy number either on your touch tone telephone or by speaking the policy number digits into your telephone." Concurrently with the transmission of such voice prompt, the common control 72 connects a touch tone receiver 90 and the speech recognition circuits 100 to the appropriate trunk interface 70. These programmed operations are shown as block 172. After the calling party identification information is either keyed in by his or her touch tone keypad or spoken by words, as indicated by program blocks 174 and 176, respectively, the caller identification information is stored (block 178). Line 124 from program decision block 122 also enters block 178, indicating that the ANI number, if forwarded by such facilities, is also stored as a caller identification number.

After having stored the caller identification number, the common control 72 proceeds to program flow block 180 where voice prompts are selected from the digitized speech storage unit 88 which are most likely to service the calling party. Such prompts may be in the nature of, "If you would like to know you cash surrender value, push 1 on your touch tone phone or speak the word 'one' into your telephone, if you would like to know your policy anniversary date, press 2 on your touch tone phone or speak the word 'two' into your telephone . . . if you would like to speak with an operator, please press 9 on your touch tone phone or speak the word 'help' into your telephone." Program flow blocks 184 and 186 or FIG. 4b indicate the operations in which the call processor circuits detect and decode either DTMF digits input by the calling party, or the voice words which are responsive to the voice prompts transmitted by the call processor 30. In the program flow, decision block 188 is encountered, in which it is determined whether the calling party indicates a desire to be connected to an attendant. If so, program flow branches along line 190 to program flow block 210 (FIG. 4c), to be described more thoroughly below.

If the calling party has responded otherwise, by inputting either the touch tone digits or the spoken words, the request for information is decoded and transmitted as a digital instruction to the host computer 18, as noted by program flow block 192. The arrangement of such digital instructions can conform to many formats including the Syntellect format which comprises a widely used data transmission protocol. Based upon the instructional message, the host computer 18 can conduct a search of its data base 20 and retrieve data responsive to the calling party's request. Such a response is also arranged by the host computer 18 according to its programming and transmitted back to the call processor 30. When the response is received from the host computer 18 (block 194), the call processor 30 correlates the host computer response to an answer message which can be stored in the digitized speech storage unit 88. Preferably, all possible answers, or segments of answers are prestored in the digitized speech storage unit 88. Those answers which are stored in segments can be arranged together, such as words or phrases, to formulate the appropriate answer. Instructional messages received from the host computer 18 will indicate the total answer, or the parts of the answers to be arranged together to define a complete answer to the inquiry. The correlation step is noted in program flow block 196. The common control 72 can receive the appropriate response from the digitized speech storage unit 88 and transmit the same to the speech generation circuits 80 for conversion into analog form. The analog answer is then transmitted to the trunk interface 70, and thus to the calling party (block 198). According to decision block 200, the call processor 30 determines whether the calling party is still off-hook, and if so, program flow branches back to block 180 where another appropriate voice prompt is selected and transmitted to the calling party. Once the inquiries of the calling party have been completely satisfied, without the intervention of an attendant, the call processor 30 is returned, via block 202, to the starting point.

As noted above, one option given to the calling party is that of communicating directly with an attendant who is situated at an attendant position 16. The calling party can elect such option, whereupon program control is transferred from block 188, along line 190, to block 210. When program flow block 210 is encountered, the call processor 30 initiates a request for service to the switching system 34 on one of the idle lines 32. The call processor 30 initiates such a request for service by outdialing one number of a group of telephone numbers in a hunt group associated with the attendant positions 16. In accordance with routine communication practices, the switching system 34 selects one of the idle attendant positions 16 of the group, and then transmits ringing or "zip tone" signals to the idle attendant. Before proceeding with the call, the call processor common control 72 must determine when the selected attendant answers the call. Thus, in the preferred embodiment of the invention, there are current detection circuits in the trunk interface 70 which detect answers from the selected attendants by noting current flowing in the selected voice grade telephone lines 32. When equipped with alternative signaling circuits, battery reversal circuits can be utilized to detect the change of polarity to identify when a selected attendant answers the call.

While these two techniques are widely known and available, it is well within the aim of the present invention to utilize speech detection circuits to determine when a selected attendant answers by speech signals. Also, while voice grade telephone lines are shown connecting the call processor 30 to the switching system 34, digital lines such as T1 lines may be utilized to equal advantage. Thus, several techniques may be utilized to allow the call processor 30 to determine when the selected attendant answers the call, the present invention is not limited by the utilization of any specific technique.

The detection of an answer from an attendant by the call processor 30 is shown by program flow block 212. The common control 72 then causes a selection for transmission of a voice prompt to the attendant to input by way of the touch tone keypad 62 or speech words, the identification number assigned to the attendant (block 214). Concurrently, the common control 72 connects the touch tone or DTMF receivers 90 and the speech recognition circuits 100 (block 216) to receive and decode the attendant identification number input (blocks 218 and 220) by the attendant. Determination of the attendant with which the instant call is associated may be made via touch tone detection or speech recognition techniques. If speech recognition is used, the speech recognition circuits 100 can then decode the voice signals of both parties, and especially the attendant, to determine the particular attendant speaking. In this situation, it is preferable that the speech recognition circuits 100 include speaker dependent capabilities to identify particular persons by their speech patterns. Speaker dependent algorithms, circuits and the like are well known in the art for identifying the speech patterns of a particular individual. A speaker dependent technique is described in U.S. Pat. No. 4,831,551, the disclosure of which is incorporated by reference herein.

Once the attendant identification number is decoded according to blocks 218 or 220, the common control 72 accesses the look-up table 110, using the attendant identification number in memory location 112 for correlation to a terminal identification number in memory location 114. As noted in FIG. 3, each horizontal entry signifies a correlation between the agent identification number, the terminal identification number and the agent extension number. Therefore, by knowing one of these identification numbers, either of the two others can be readily ascertained. Once a correlation match is found, as noted by block 222, the call processor 30 transmits signals along conductor 74 to cause a cut-through of the incoming trunk 28 to the voice grade line 32 (block 224), thereby connecting the calling party to the audio equipment 14 of the selected attendant.

According to programmed block 226, the common control 72 accesses its memory to retrieve the identification information previously input by and associated with the calling party. The calling party identification information and the data terminal identification information is transmitted by the call processor 30 on data link 40 to the host computer 18. The common control 72 transmits instructions (228) including both types of identification information to cause the host computer 18 to display data associated with the caller's identification information, on the terminal 22 correlated to the identification information input by the attendant. In response to the instructions, the host computer 18 accesses the data base 20 and retrieves the data identified by the calling party and transmits the same on the data link 54 to the data terminal 22 associated with the identification information. The attendant can thereby speak and listen to the calling party by way of the audio equipment 14 and at the same time provide an interchange of data information as viewed from the screen of the data terminal 22. Of course, the attendant can input data by way of the keyboard 56 for storage by the host computer 18 in the data base 20, and can input commands for retrieving further or other data which may be useful in serving the calling party.

Program flow decision block 230 illustrates the operations carried out by the common control 72 in monitoring the calling party for on and off-hook conditions. If no on-hook is detected, the call processor 30 can be maintained in the loop as noted, or more preferably, the common control 72 services other requests for service and ongoing communications within the complex 10. In the event the calling party goes on-hook, i.e., hangs up, the call processor common control 72 resets the voice connections, and prepares the circuits for processing another incoming call.

Figure 5:
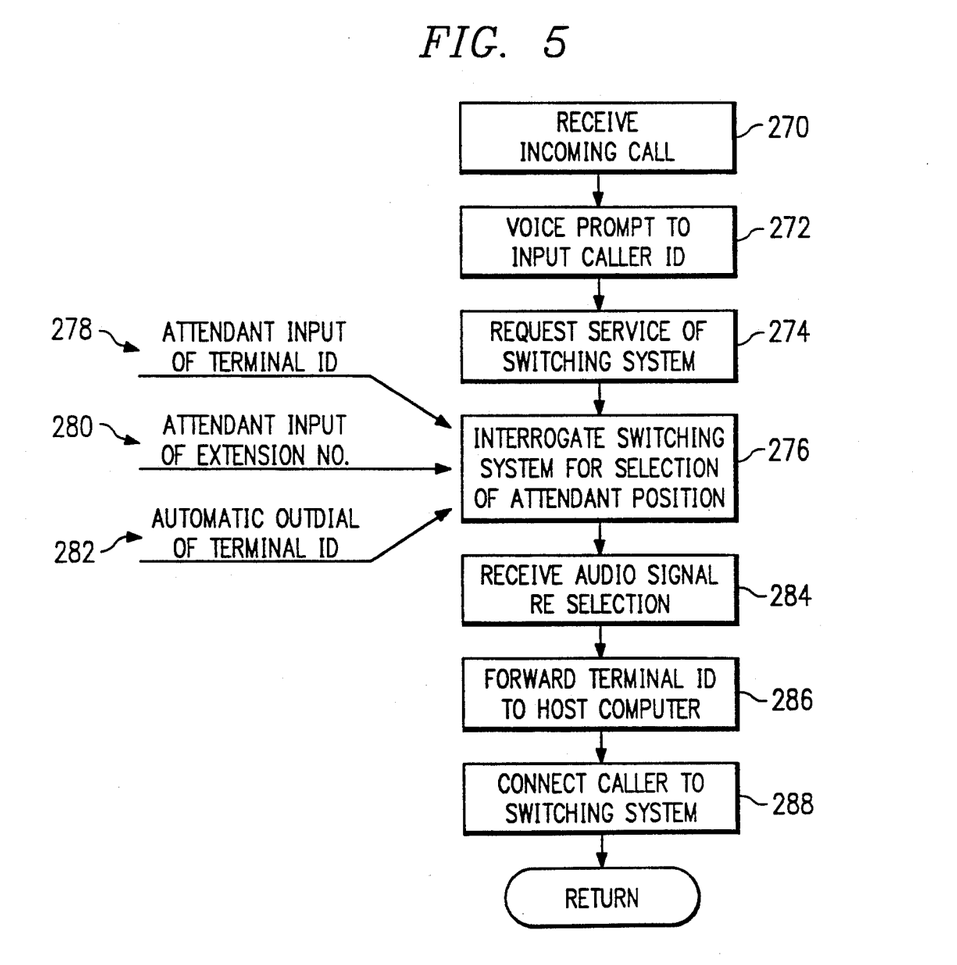
FIG. 5 is a flow chart illustrating another technique for controlling a switching system and a data processing system to provide data and voice communications to a calling party.

While the foregoing illustrates what is contemplated to be the preferred form of the invention, FIG. 5 illustrates other techniques for providing control over a switching system and host data processing system so that both data and voice communications can be provided to a calling party. According to program flow block 270 of FIG. 5, the call processor 30 receives incoming calls from the local central office 24, which calls are initially directed to the switching system 34. According to conventional call processing techniques, the call processor 30 receives the incoming call and provides a voice prompt to the calling party to input identification information, such as described above. These functions are shown generally in program flow block 272. The calling party identification information is received and temporarily stored by the call processor 30 for subsequent use. Next, the call processor 30 requests service of the switching system 34 (block 274), such as by transmitting ringing signals on an interconnecting subscriber line 32.

In response to the request for service, the switching system 34 selects an idle operator or attendant position 16. The call processor 30 then interrogates the switching system 34 to determine which attendant position 16 has been selected to serve the incoming call. One technique is shown at the bottom of block 276 by the action of the attendant inputting by way of the keypad 62 the terminal identification number itself. This may be in response to a voice prompt, a tone, or other signal transmitted by the call processor 30. In such event, the call processor 30 need not cross reference such input by the use of a lookup table, but rather can use the information directly and forward the terminal identification number to the host computer 18.

Alternatively, the attendant can input the extension number of the subscriber line 42 associated with the selected attendant position 16. Since each subscriber line 42 is uniquely associated with an attendant position 16, such information can be utilized for cross referencing in a look-up table by the call processor 30 to determine the appropriate terminal identification number. Of course, the input of both types of identification information by the attendant can also be provided by way of voice words which can be decoded by the speech recognition circuits, as described above. The input of either the terminal ID itself or the extension number, or even the attendant's identification number can be accommodated by the call processor 30 by receiving such information and consulting a first table to determine what type of identification information has been input at the attendant position 16. Then, by determining what type of identification information has been input, the call processor 30 can then either access a look-up table to correlate such information to a terminal ID, or if the terminal ID itself has been input, use such information directly for transferral to the host computer 18.

As yet another alternative, the attendant position 16 can be equipped with automatic outdialing circuits which are responsive to the selection of the attendant position 16 for automatically outdialing the terminal identification number. Hence, no action on the part of the attendant is required to input identification information, but rather when the switching system 34 selects the idle subscriber line 42, the attendant position outdial circuits respond appropriately by automatically outdialing the terminal identification number, or other preprogrammed identification information. Preferably, such outdialing is accomplished by the use of DTMF tones which are decoded by the touch tone receivers 90 of the call processor 30. Again, the outdialed terminal identification number can be used directly by the call processor 30 for transferral to the host computer 18.

A certain amount of handshaking between the call processor 30 and the attendant position 16 can also be carried out to solicit or enable the automatic outdialing of identification information. For example, once the switching system 34 has selected an idle subscriber line 42 associated with an attendant position 16, the call processor 30 can transmit to the switching system 34 a predefined tone, or series of tones, which can be decoded by circuits in the attendant position 16 and signify the outdialing of the identification information. In response to the tone transmitted by the call processor 30, the automatic outdialing circuits of the attendant position 16 transmit on the subscriber line 42 identification information of the attendant position 16.

With reference again to FIG. 5, there are shown in program flow block 284 the operations of the call processor 30 in receiving the audio signals transmitted thereto, which signals indicate the identity of the selected attendant position 16. Then, the call processor 30 forwards the terminal identification information to the host computer 18. The terminal information, if received directly, can be transmitted to the host computer 18, or can be derived by way of a look-up table in a manner noted above. As noted in program flow block 288, the call processor can then connect a calling party to the switching system 34 so that both data information and voice communications can be carried out between the calling party and the attendant associated with the position 16.

From the foregoing, disclosed is telecommunication apparatus and various methods for providing an economical technique for controlling a switching system and a host computer for efficient attendant position operation. In accordance with the equipment of the communication complex of the invention, the switching system can be of the conventional type, with little or no modification, as can be the host computer. Therefore, by employing the call processor of the invention, identification information can be solicited, obtained and transferred so that the switching system and the host computer need not be tightly connected, as is typical with the prior art systems.

While the preferred and other embodiments of the invention have been disclosed with reference to specific telecommunication systems, circuits, and programming thereof, it is to be understood that many changes in detail may be made as a matter of engineering choices without departing from the spirit and scope of the invention, as defined by the appended claims.

What is claimed is:

1. A communication complex, comprising in combination:
   a telecommunication switching system for switching incoming communication lines to a plurality of attendant positions;
   a plurality of data terminals each associated with an attendant position for displaying data;
   a data processing system for storing and retrieving data, said data processing system being adapted for selectively driving said data terminals for displaying data thereon;
   a call processor for coupling incoming calls to said switching system and being connected to said data processing system, said call processor being adapted for correlating attendant positions with said data terminals; and
   said call processor being programmed to establish communications with an attendant position via said switching system and receive attendant identification information therefrom and correlate said identification information with one said data terminal, and to transmit terminal identification information to said data processing system so that data can be retrieved and transmitted to a selected data terminal associated with said attendant.

2. The communication complex of claim 1, wherein said call processor is programmed to transmit a verbal prompt to a calling party requesting identification information, and for communicating calling party identification information to the data processing system for retrieving data associated with the calling party.

3. The communication complex of claim 2, further including transmitting a verbal prompt to an attendant to input identification information, and wherein the identification information comprises attendant identification information.

4. The communication complex of claim 1, wherein said data processing system transits data associated with a calling party to the selected data terminal, and said call processor causes a connection to be established between the calling party and an attendant position via the switching system.

5. The communication complex of claim 1, wherein said call processor includes voice recognition apparatus, and wherein said calling party is caused to be connected to an attendant position via said switching system, and when said attendant speaks, voice recognition equipment in said call processor effects an identity of the attendant to define said attendant identification information.

6. The communication complex of claim 1, wherein said call processor includes a correlation table for correlating attendant identification information with data terminal identification information.

7. The communication complex of claim 6, further including means operable by the attendants associated with said positions for programming said correlation table.

8. The communication complex of claim 6, wherein said table further includes a telephone extension number associated with each attendant position.

9. The communication complex of claim 6, further including means for programming by the attendants identification information in said correlation table.

10. The communication complex of claim 9, further including means for transmitting by the call processor a verbal prompt to an attendant to input one or the other of attendant identification information or terminal identification information.

11. The communication complex of claim 6, further including means for accessing the call processor by the attendant to program the correlation table.

12. The communication complex of claim 11, further including means for programming by the attendant the correlation table each time the attendant changes attendant positions.

13. A communication complex for distributing incoming calls to a plurality of attendant positions, each associated with a data terminal, comprising:
- a switching system having incoming lines switchable to audio equipment associated with each attendant position;
- a host computer having a data base adapted for storing records that can be associated with incoming calls, said host computer connected for communicating with each of a plurality of the data terminals for causing a selected record to be displayed thereon;
- a call processor for receiving the incoming calls and causing the switching system to distribute the incoming calls to the attendant positions, said call processor receiving respective identification information from the attendant positions, and said call processor correlating the identification information with respective data terminal identities, and transmitting a correlated data terminal identity to said host computer so that said host computer can transmit the selected record to a data terminal associated with the data terminal identity; and
- a correlation table stored in said call processor for correlating the identification information to respective data terminals.

14. The communication complex of claim 13, wherein said call processor is responsive to a request from an attendant position to preprogram the correlation table with new correlations between identification information and data terminals.

15. The communication complex of claim 13, wherein said call processor receives incoming call identification information and transmits incoming call identification information to the host computer.

16. The communication complex of claim 13, further including voice grade communication lines for connecting the call processor to the switching system, and a data link for connecting the call processor to the host computer.

17. A communication complex for distributing incoming calls to a plurality of attended data terminal positions, comprising:
- a telephone call distribution system for receiving incoming calls and distributing the calls to respective attended audio equipment;
- a data storage system for storing records associated with calling parties and causing the display of records on selected data terminal positions; and
- said call distribution system including a look-up table for correlating each audio equipment with a different data terminal position, and said call distribution system is responsive to receipt of audio equipment identification information for accessing said look-up table for defining data terminal position identification information for transferral thereof to the data storage system.

18. The communication complex of claim 17, wherein said look-up table has entries programmable by attendants associated with said data terminal positions.

19. The communicate complex of claim 17, wherein said look-up table includes data terminal position identification information and attendant identification information.

20. The communication complex of claim 19, wherein said look-up table further includes telephone extension, information associated with each said attended data terminal position.

21. The communication complex of claim 17, further including a call processor and a switching system defining said call distribution system.

22. The communication complex of claim 21, wherein said call processor controls the connection of incoming calls to said switching system.

23. The communication complex of claim 21, wherein said call processor controls the data storage system for transmitting data to a selected data terminal position.

24. The communication complex of claim 22, wherein said call processor communicates with said switching system with conventional telecommunication signals on conventional telecommunication lines.

25. A method for distributing incoming calls to a plurality of attendant positions having associated therewith data terminals and audio equipment, comprising the steps of:
- in response to an incoming call to a switching system, accessing the audio equipment of a selected attendant position for requesting identification information;
- receiving by the switching system identification information defining an identity of the selected attendant position;
- transmitting by the switching system to a call processor the received identification information;
- correlating by the call processor the received identification information with a data terminal associated with the selected attendant position;
- transmitted by the call processor data terminal identification information to a host computer so that the host computer can transmit a record of data to the data terminal associated with the terminal identification information; and
- connecting the incoming call to the audio equipment of an attendant position providing the identification information.

26. The method of claim 25, further including transmitting a voice prompt to an incoming calling party for soliciting calling party identification information; and correlating received calling party identification information with a record of data to be displayed on the data terminal associated with the terminal identification information.

27. The method of claim 25, further including accessing the call processor by an attendant to provide attendant identification information for correlating audio equipment with a specific data terminal.

28. A method for distributing incoming calls to a plurality of attendant positions having associated therewith data terminals and audio apparatus, comprising the steps of:
- in response to an incoming call received by a call processor, requesting service of a switching system to cause the switching system to select an idle attendant position;

receiving by the call processor an audio indication of the identity of the selected attendant position; and transmitting by the call processor to a data processing system an indication of a data terminal associated with the selected attendant position so that the data processing system can transmit data for display on the data terminal associated with the selected attendant position.

29. The method of claim 28, further including receiving by the call processor data terminal identification information.

30. The method of claim 28, further including using said identity of the selected attendant position for accessing a look-up table to define a data terminal identity associated with the selected attendant position.

31. The method of claim 28, further including automatically outdialing by the selected attendant position identification information uniquely associated with the selected attendant position.

* * * * *